US011536256B2

(12) United States Patent
Dankbaar et al.

(10) Patent No.: US 11,536,256 B2
(45) Date of Patent: Dec. 27, 2022

(54) ACTUATOR

(71) Applicant: Lear Corporation, Southfield, MI (US)

(72) Inventors: Frank Dankbaar, Tidaholm (SE); Anders Grönhage, Mullsjö (SE)

(73) Assignee: LEAR CORPORATION, Southfield, MI (US)

( * ) Notice: Subject to any disclaimer, the term of this patent is extended or adjusted under 35 U.S.C. 154(b) by 331 days.

(21) Appl. No.: 16/853,864

(22) Filed: Apr. 21, 2020

(65) Prior Publication Data

US 2020/0347833 A1    Nov. 5, 2020

(30) Foreign Application Priority Data

Apr. 30, 2019    (EP) .................................... 19171918

(51) Int. Cl.
  *F03G 7/06*     (2006.01)
  *B60N 2/66*    (2006.01)
  *F16K 1/36*    (2006.01)

(52) U.S. Cl.
  CPC .............. *F03G 7/065* (2013.01); *B60N 2/665* (2015.04); *F03G 7/06* (2013.01); *F16K 1/36* (2013.01)

(58) Field of Classification Search
  CPC ........... F03G 7/065; F03G 7/06; B60N 2/665; B60N 2/914; F16K 1/36; F16K 31/025; F16K 31/02; F16K 27/00
  USPC .............................. 60/527–529; 310/305–306
  See application file for complete search history.

(56) References Cited

U.S. PATENT DOCUMENTS

| 7,052,251 B2 * | 5/2006 | Nason ................... F04B 19/006 604/152 |
| 7,555,900 B1 * | 7/2009 | Vallance ................. F03G 7/065 60/528 |
| 2012/0153043 A1 | 6/2012 | Arekar et al. |
| 2012/0297763 A1 * | 11/2012 | Mankame ............... F03G 7/065 60/527 |

(Continued)

FOREIGN PATENT DOCUMENTS

| DE | 102017217213 B3 | 3/2019 |
| EP | 0841510 A1 | 5/1998 |

(Continued)

OTHER PUBLICATIONS

European Search Report for Application EP 19171918 dated Nov. 5, 2019, 2 pages.

(Continued)

*Primary Examiner* — Hoang M Nguyen
(74) *Attorney, Agent, or Firm* — Brooks Kushman P.C.

(57) ABSTRACT

An actuator includes a sliding body moveable along a guide between a rest position and a retracted position, a spring resting on a support body and acting to exert a bias force urging the sliding body to the rest position, and a SMA wire having opposite ends being mechanically and electrically connected to a respective one of two stationary contacts and forming a loop between the opposite ends which is connected to the sliding body, wherein the SMA wire is arranged to, when activated by electric energy supply, pull the sliding body away from the rest position to the retracted position, wherein the guide is fixed to a first end portion, the support body is fixed to an intermediate portion, and a contact holding body, in which the two contacts are incorporated, is fixed to a second end portion of a mounting bar.

20 Claims, 7 Drawing Sheets

(56) References Cited

U.S. PATENT DOCUMENTS

2013/0111896 A1* 5/2013 Foshansky .............. F03G 7/065
                                                                60/527
2015/0225824 A1     8/2015 Merideth

FOREIGN PATENT DOCUMENTS

| EP | 3281821 A1 | 2/2018 |
|---|---|---|
| JP | S61103081 A | 5/1986 |
| WO | 2013063511 A2 | 5/2013 |
| WO | 2014135909 A1 | 9/2014 |
| WO | 2015185132 A1 | 12/2015 |

OTHER PUBLICATIONS

Machine-assisted English language abstract for DE 10 2017 217 213 B3 extracted from espacenet.com database on Jun. 11, 2020, 2 pages.
English language abstract for JPS 61-103081 A extracted from espacenet.com database on Jun. 11, 2020, 1 page.

* cited by examiner

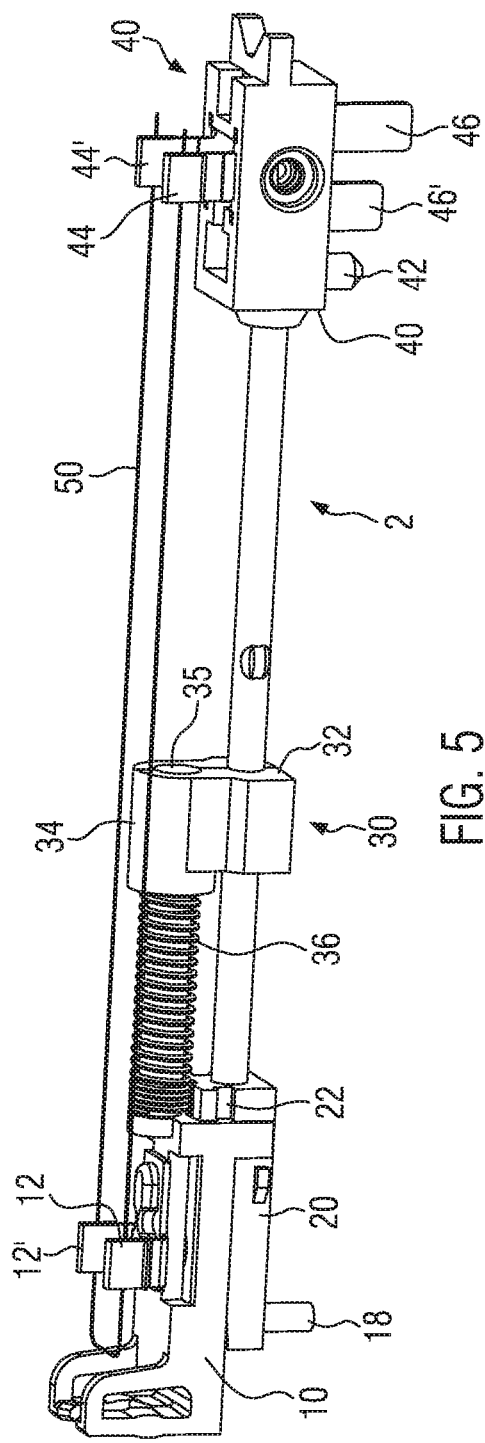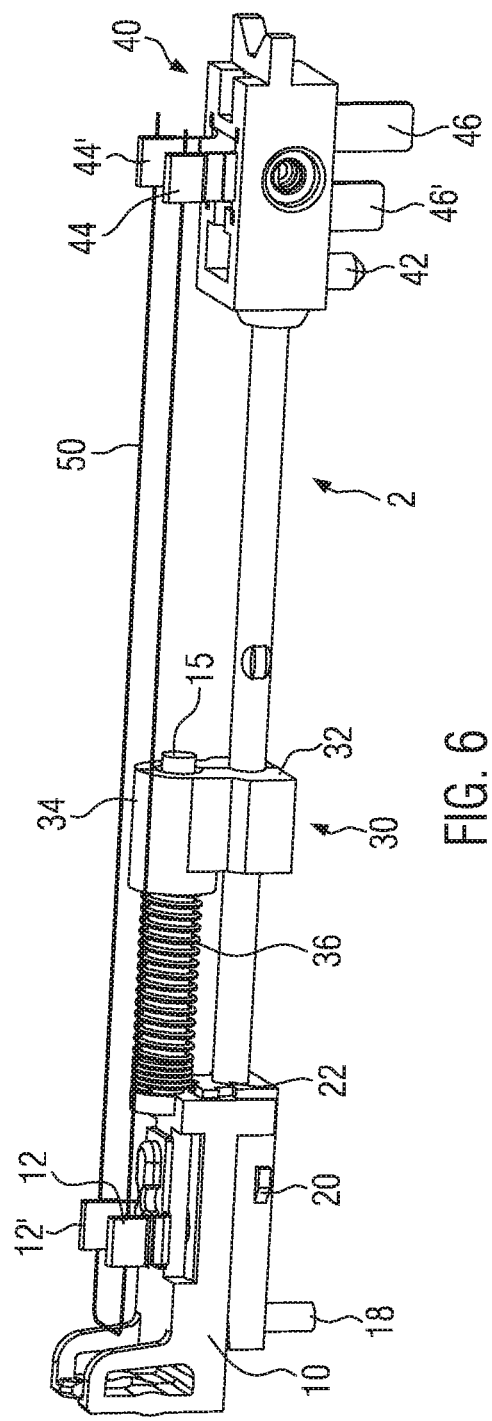

ACTUATOR

The subject application claims priority to and all the benefits of European Patent Application No. 19171918.6, filed on Apr. 30, 2019, the contents of which are incorporated herein by reference in their entirety.

The present invention is directed to an actuator comprising:
- a sliding body moveable along a guide between a rest position and a retracted position;
- a spring resting on a support body and acting on the sliding body to exert a bias force urging the sliding body to the rest position; and
- a SMA wire having two opposite ends being mechanically and electrically connected to a respective one of two stationary contacts and forming a loop between the opposite ends which is connected to the sliding body, wherein the SMA wire is arranged to, when activated by electric energy supply, pull the sliding body away from the rest position to the retracted position.

A typical field of application of such actuators is in the automotive industry. Drivers and passengers of motor vehicles, spatially when driving long distances often experience discomforts caused by long time static posture when seated in the vehicle seat. To provide a remedy the automotive industry since sometime offers vehicle seats with adjustable lumbar supports and bolsters, and in high and equipments with integrated massage system in the backrests which are periodically inflated and deflated to provide a massage effect. The lumbar supports and bolsters in seats are adjusted by inflating air cells by supplying pressurized air to the air cells. Pressurized air supply is stopped and the air cells are closed, i.e. the air cells are maintained in the current inflated state, once the lumbar support or bolsters reached the desired inflation state. In massage systems series of air cells in the backrest are sequentially inflated and deflated to provide a massage effect. Since for such applications in backrest of vehicle seats large numbers of valves are needed, the valves should be of simple and cost efficient design, but nevertheless insure reliable long term performance. In this field of application a particular type of valve is now in widespread use, namely the so-called SMA valve. A SMA valve comprises a housing, a valve piston a spring the valve piston to a closed position in a valve seat, and an actuator capable of acting on the piston such that the actuator upon activation exerts a force on the valve piston which moves the piston way from the valve seat to an open position and keeps it there as long as the actuator remains activated. In this case the actuator comprises a metal wire made of a shape memory alloy (SMA), which SMA wire is connected to the piston and to a part that is stationary in the housing. Such shape memory alloy changes its microscopic structure at a threshold temperature such that a SMA wire shortens upon exceeding the threshold temperature. In particular, a SMA material is at room temperature in the state of a metal with martensitic properties, whereas the structure transitions at a threshold temperature of about 80° C. into an austenitic structure. Due to this transition a SMA wire shortens, wherein the shortening provides the force acting on the piston to move it away from the valve seat. Actuation of the SMA valve is controlled by selectively supplying electric power to the SMA wire to heat it up to the threshold temperature into keep it at such temperature for the desired activation cycle, whereafter electric power supply to the SMA wire is terminated to let the SMA wire cool down below the threshold temperature. A causes that the shortening of the SMA wire is reversed and that it returns to its original length which permits the spring to move the valve piston back to the close position in the valve seat. A valve including an SMA actuator for controlling pressurized air supply to an air cell in a vehicle seat is for example described in WO 2015/185132 A1. In this design the valve is suspended in a parallelogram suspension including two carrier arms, each carrier arm being connected to a mounting plate and to the valve piston by solid state hinges, wherein mounting plate, carrier arms and valve piston are integrally formed from plastics in one piece. Among the drawbacks of this design is the relatively large space requirement of the parallelogram suspension of the valve piston, and problems associated with thermal expansion of the valve piston/parallelogram suspension upon temperature increase of the drawbacks plastics material.

EP 3 281 821 A1 describes a valve assembly comprising several parallel valves arranged in a housing, wherein the valve pistons are operated by SMA actuators.

Document DE 10 2017 217 213 B3 discloses a valve that is operated by a SMA. The actuator comprises a sliding body mounted on a guide to be moveable between a rest position and a retracted position in which a valve opening has been opened by the actuator. A SMA wire is fixed with two opposite ends to stationary contacts in a rearward end portion of a valve housing. The stationary contacts provide for mechanical connection to anchor the SMA wire in the valve housing, and for electric connection to permit electric energy supply to the SMA wire. Extending from the rearward stationary contacts a loop portion of the SMA wire extends from the two stationary contacts forward and is at a forward end portion of the sliding body facing away from the stationary contacts guided around the tip portion in a 180 degrees curve, wherein the movement of the sliding body to the retracted position causes a valve element to be moved away from a valve seat to thereby open the valve. The design of the SMA actuator disclosed is such that the individual components, such as sliding body, support body for mounting the spring, and the stationary contacts, as well as the SMA wire have to be assembled individually to provide the actuator in place at the valve that is to be actuated by the actuator.

It is an object of the present invention to provide a SMA actuator that operates in a precise and reliable manner and that can be installed to actuate a component, such as a valve.

According to the present invention the guide of the sliding body is fixed to a first end portion of an elongated mounting bar, the support body is fixed to an intermediate portion of the elongated mounting bar, and a contact holding body in which the two stationary contacts are incorporated is fixed to a second end portion, opposite to the first end portion, of the mounting bar. Thus, instead of individually assembling and mounting the components of the actuator in a housing next to the component to be actuated, the components of the actuator are positioned with respect to each other and preassembled to an autonomous and stand-alone mechanism by mounting all components on the elongated mounting bar. This also allows to precisely define the position of the components fixed to the mounting bar (guide, support body and contact holding body), wherein the mounting bar can be configured to have a low thermal expansion upon temperature increase, for example by forming the elongated mounting bar as a metal pin, so that the precise positioning of the components of the actuator and the performance of the actuator are not affected by temperature variations.

In addition, by preassembling the actuator components to an autonomous and stand-alone mechanism along the elongated mounting bar it is possible to test the operation and performance of each preassembled actuator in advance in a test device, before assembling it in the housing next to the component to be actuated. This is in particular advantageous for applications where large number of parallel actuators have to be installed in a housing. Testing of the autonomous and stand-alone actuator mechanism before installing it permits to install only actuators that were found to fulfill performance criteria within predetermined ranges. A preassembled actuator can for example be placed on a printed circuit bar of a test device allowing to connect the stationary contacts to contact points on a printed circuit board so that electric energy can be supplied to the SMA wire to test the performance of the actuator.

The features that the guide is fixed to a first end portion of the elongated mounting bar, and that the contact holding body is fixed to second, opposite end portion do not require that the guide is enclosing the first end and that the contact holding body is enclosing the second end; in principle it is also possible that a tip portion of the elongated mounting bar extends through and for a short distance beyond the guide, or that a rearward end section of the elongated mounting bar extends through and beyond the contact holding body.

It should be noted that the guide and the support body do not have to be separate parts. In principle it is also possible that the guide and the support body are portions of an integrally formed member which is for example formed by injection molding as an overmolded component on the elongated mounting bar.

In a preferred embodiment the guide fixed to the first end portion of the elongated mounting bar is formed as a guide rail comprising at least one linear guide slot extending parallel to a longitudinal direction of the elongated mounting bar. The sliding body is provided with at least one protruding ledge which is configured to be received in and to be slidably movable along the at least one guide slot to guide the sliding body along the guide rail.

In a preferred embodiment the sliding body at least partially encompasses the guide rail; in other words the sliding body, in a cross-sectional view in a plane perpendicular to the longitudinal axis of the elongated mounting bar, the sliding body extends around at least part of the circumference of the guide rail. The guide rail has at least two protruding ledges, and the guide rail has at least two complementary arranged guiding slots which are spaced apart from each other in a circumferential direction in a plane perpendicular to the direction of linear extension of the guide slots. In this manner the protruding ledges received in the guide slots provide for engagement of the sliding body and the guide rail against any movements transverse to the direction of linear extension of the guide slots, i.e. the sliding body may slide along the guide slots, but cannot be separated from the guide rail. Such an engagement may for example be achieved by two protruding ledges which are spaced apart 180 degrees in circumferential direction and are received in associated guide slots on opposite sidewalls of the guide rail so that the protruding ledges engaging the guide slots on opposite sides of the guide rail allow only movements along the guide slots.

In a preferred embodiment the support body for the spring comprises a mounting portion enclosing the elongated mounting bar in its intermediate portion and being connected thereto. A socket is connected to the mounting portion, wherein the socket has an opening facing towards the sliding body and is arranged to receive and support an end portion of the spring, wherein the spring is a helical compression spring which is held by the socket to extend parallel to a longitudinal axis of the mounting bar and towards the sliding body to be able to exert a bias force on the sliding body urging it away from the support body.

In a preferred embodiment the sliding body is, at its end portion facing towards the support body provided with a stud extending in a direction parallel to the longitudinal direction of the elongated mounting bar towards the intermediate portion thereof. The stud is dimensioned and arranged to be received in the interior of the spring, which is formed as a helical compression spring, and to extend along at least a part of its length therein. In this manner the spring is with one of its end portion supported and held in place in the socket, and is stabilized by the stud of the sliding body extending into the interior of the helical spring through the opening in the end opposite to the end received in the socket. In this manner the spring is safely held in position and any flexing of a portion of the spring away from its longitudinal axis is prevented.

Preferably, the stud of the sliding is provided with a frustoconical outer end portion, i.e. the end portion that is remote from the end connected to the sliding body. The socket has, opposite to the opening receiving the helical compression spring, a further opening of lower diameter and coaxial to the opening receiving the helical compression spring. This further opening leaves an annular bottom wall portion of the socket surrounding the further opening, on which annular bottom wall portion the helical compression spring rests. This further opening is arranged to receive a tip portion of the frustoconical outer end portion when the sliding body is moved to the retracted position. In such an embodiment the stud may extend along the entire length of the helical compression spring, wherein the movement of the sliding body to the retracted position is accompanied by the tip of the frustoconical outer end portion penetrating the further opening.

As an alternative to the stud extending from the sliding body as described before, a central stud may be provided in the socket extending from the socket through its opening and towards the sliding body in a direction parallel to the longitudinal axis of the elongated mounting bar, wherein the central stud is dimensioned to be received in the interior of a spring which is a helical compression spring that is received with an end portion thereof in the socket. The central stud may extend into close vicinity of the sliding body, leaving a gap sufficiently wide to allow the sliding body to be pulled back to the retracted position without interfering with central stud of the socket. Alternatively, the sliding body may be provided with an end opening, arranged to receive a tip portion of the central stud when the sliding body pulled to the retracted position. Such central stud may likewise stabilize the spring and prevent any flexing of a portion of the spring away from its longitudinal axis.

In a preferred embodiment the SMA wire is arranged to extend from a first one of the two stationary contacts of the contact holding body along the elongated mounting bar and is connected to a first connector which is incorporated in the sliding body. From there the SMA wire extends to turn around in a 180 degrees curve and is connected to a second connector incorporated in the sliding body next to the first connector, and extends from there back along the elongated mounting bar to the second one of the two stationary contacts to which it is connected. The first and second connectors to which the SMA wire is connected may be crimp contact to allow connection to the SMA wire by crimping.

In a preferred embodiment the first and second connectors incorporated in the sliding body are conductive and are electrically connected to each other. In this manner there is a single SMA wire, wherein a short circuit is created between the first and second connectors so that almost no current is flowing through the section of the SMA wire turning around in a 180 degrees curve around, but rather through the first and second connectors which may be sections of an integrally formed conductor component. This is advantageous for the following reason. If there would be current flow through the curved, turned around section of the wire, this wire section would heat up and would also shorten. In case the curved, turned around part of the wire is routed around a curved guiding part supporting the curved wire section, shortening of the wire in this curved area would be accompanied by pulling forces exerted by the curved wire section on the first and second connectors to draw further wire length to the curved section to compensate its shortening. This would introduce stress in the curved wire section, and in particular at the connections to the first and second connectors. By providing a conductive connection between the first and second connectors current flow through the curved section of the wire is substantially reduced so that no significant heating takes place in this curved section, thereby avoiding shortening of the wire in this curved wire section and the resulting stresses in this wire section.

Alternatively, since no current is flowing through the curved section of the SMA wire, there may also be embodiments using two separate parallel SMA wires, a first SMA wire extending form a first one of the two stationary contacts along the elongated mounting bar which is connected to a first connector incorporated in the sliding body. A second SMA wire is arranged to extend from a second one of the two stationary contacts along the elongated mounting bar and is connected to a second connector incorporated in the sliding body next to the first connector. The first and second connectors incorporated in the sliding body are electrically conductive and are electrically connected to each other, thereby closing the electric circuit between the first and the second connectors and the SMA wires.

In a preferred embodiment the elongated mounting bar is a metal pin or rod, for example of cylindrical shape.

In a preferred embodiment the elongated mounting bar is provided with projections and/or recesses in its surface in the first end portion, in the intermediate portion and in the second end portion. The guide, the support body and the contact holding body are each made of plastics by injection-molding as overmolded components surrounding and enclosing the elongated mounting bar, wherein the overmolded plastic material embedded and/or filled the projections and/or recesses of the elongated mounting bar to provide a positive-locking engagement against movements of the guide, the support body and the contact holding body on the elongated mounting bar in its longitudinal direction.

In a preferred embodiment the actuator is mounted on a printed circuit board. The stationary contacts are partially embedded in the contact holding body and project therefrom into opposite directions, namely in a first direction extending away from the printed circuit board to provide the stationary contacts for the SMA wire, and in a second direction opposite to the first direction and towards the printed circuit board to form end tabs extending to the printed circuit board, wherein each end tab is electrically and mechanically connected to the printed circuit board by extending through a slot in the printed circuit board, which slot has conductive edges, wherein the connection of each of the end tabs in the associated slot is formed by a permanent deformation of the end tab to a bent or twisted shape in contact with the conductive edge of the slot. In this manner the bent or twisted state of the end tab in the slot provides for a mechanical connection of the end tab to the printed circuit board. At the same time the deformation of the end tab in the slot ensures that at least portions of the surface of the bent end tab are in contact with portions of the conductive edge of the slot, thereby providing electric connection of the end tab to the printed circuit board. The end tab may be first inserted with its end portion to extend through the slot to protrude from the opposite side of the printed circuit board. Then the protruding end portion of the end tab is bent or twisted into a deformed state into engagement with the slot.

In a preferred embodiment the guide and the contact holding body are provided with a, preferably integrally formed, support pin extending away from the elongated mounting bar and towards the printed circuit board. Each support pin is configured to be received in a mounting opening of the printed circuit board to attach the actuator on the printed circuit board. According to the present invention there is also provided a valve for controlling pressurized air flow to an inflatable air cell in the vehicle seat, comprising: a valve chamber communicating with a spigot and having a valve chamber opening, a valve piston which is movable between a position in abutment on a valve seat around the valve chamber opening and a retracted position pulled away from the valve seat to open the valve chamber opening, and an actuator according to any of the preceding claims, wherein the sliding body of the actuator is coupled to the valve piston such that, upon activation of the actuator by electric energy supply to the SMA wire, the valve piston is pulled away from the position in abutment on the valve seat by the movement of the sliding body from the rest position to the retracted position.

The invention will now be described with reference to a preferred embodiment shown in the drawings in which:

FIG. 5 is a perspective view of the actuator of FIGS. 1 to 4, wherein the actuator is not activated and its sliding body is in a rest position;

FIG. 6 shows a perspective view as in FIG. 5, but in the activated state in which the sliding body 10 is pulled back to a retracted position;

Figure 7:
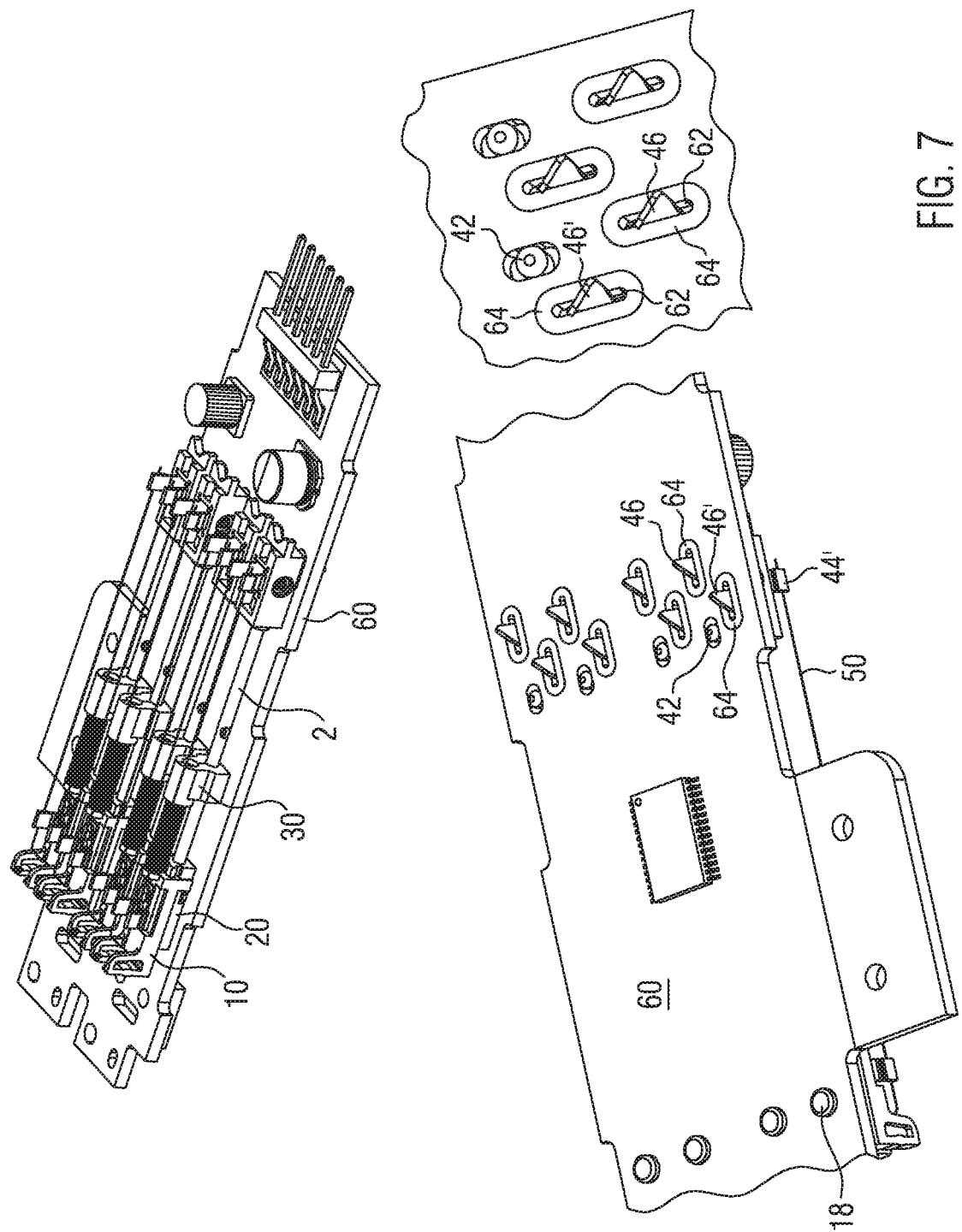
Figure 8:
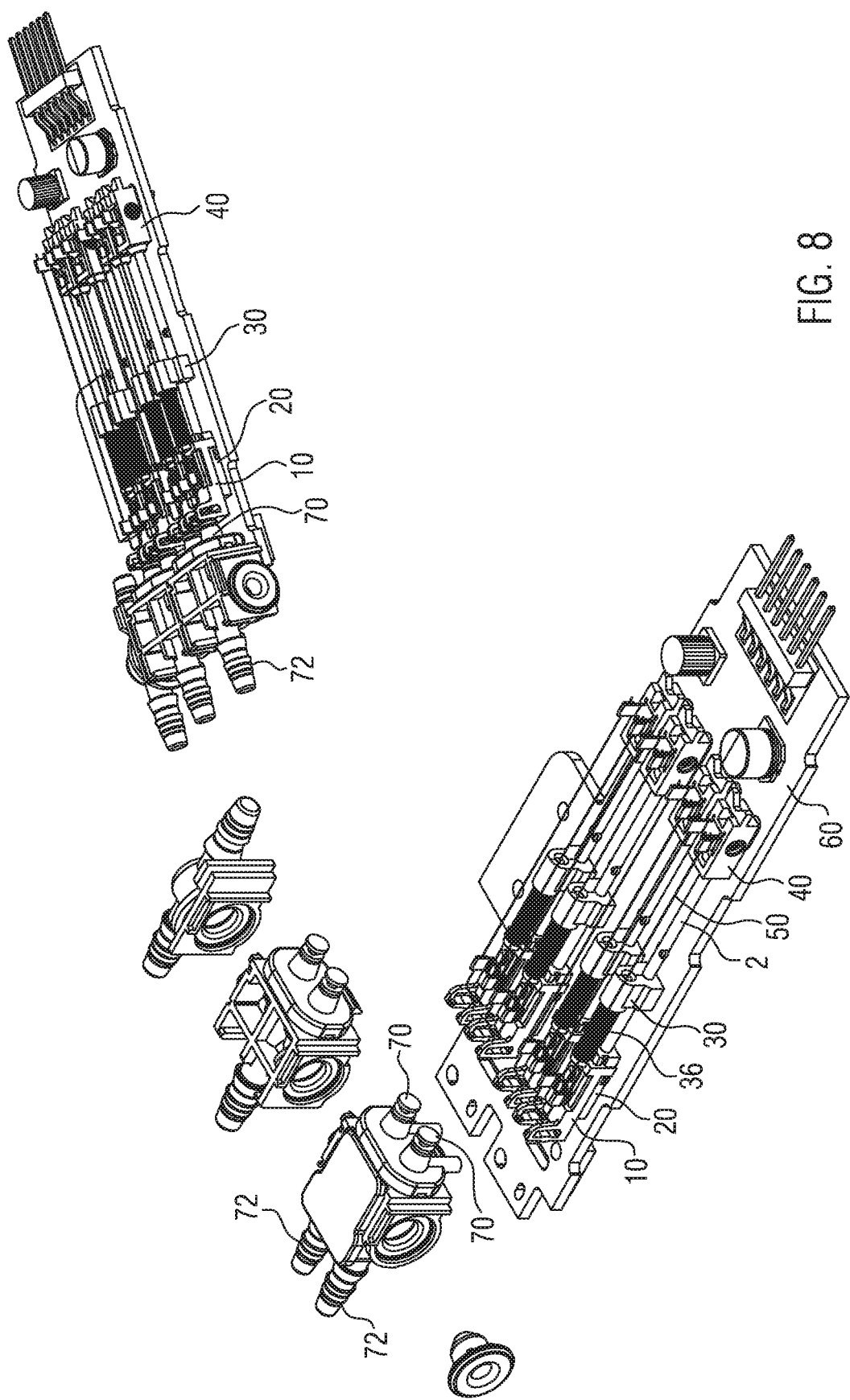

FIG. 7 shows a perspective view of an assembly of four parallel SMA actuators according to the present invention mounted on a printed circuit board, wherein in addition a perspective view of a lower side of the printed circuit board and an enlarged detail thereof are shown; and FIG. 8 shows a perspective view of a valve assembly comprising four parallel SMA actuators according to the present invention, wherein in addition to the perspective view a perspective exploded view of the valve elements is shown.

Figure 1:
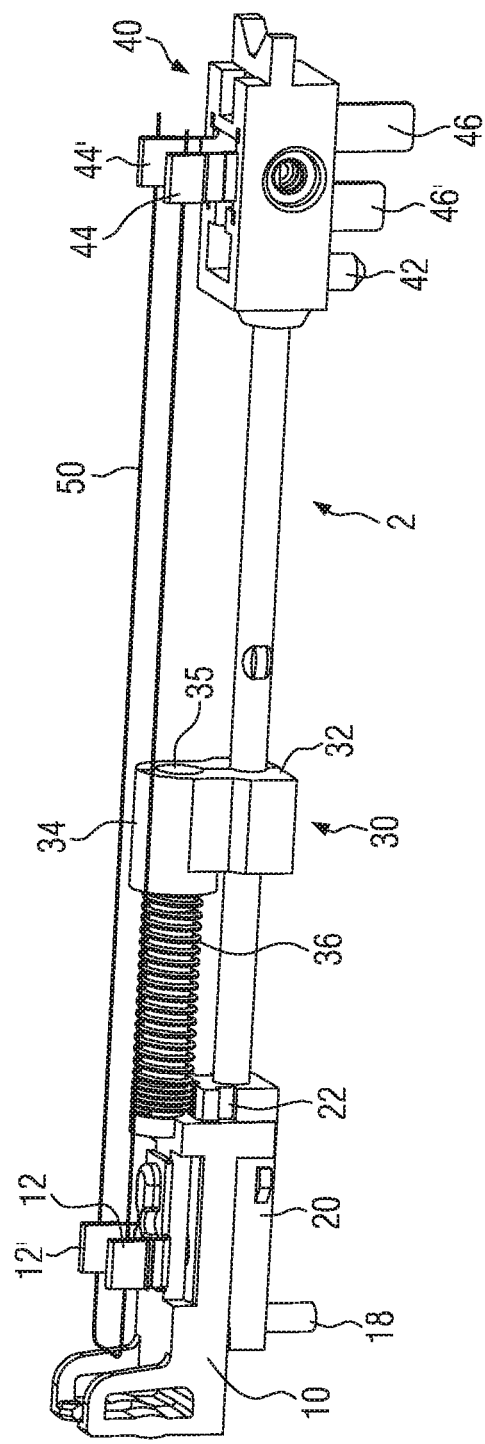
FIG. 1 shows a perspective view of an actuator according to the present invention.

In the following an overview of a preferred embodiment of an actuator according to the present invention will be given with reference to FIGS. 1 to 3. FIG. 1 shows a perspective view of the actuator, FIG. 2 a perspective exploded view of the actuator of FIG. 1, and FIG. 3 a perspective view of the actuator of FIGS. 1 to 2 with some of its components removed. The actuator comprises an elongated mounting bar 2 which is in the preferred embodiment shown formed by an elongated metal pin or rod. To the elongated mounting bar a guide 20 is connected in a first end portion of the elongated mounting bar 2, a support body 30 in an intermediate portion of the elongated mounting bar, and a contact holding body 40 at a second end portion of the elongated mounting bar opposite to the first end portion. In this embodiment the guide 20, the support body 30 and the contact holding body 40 are injection molded parts formed as overmolded components on the elongated mounting bar 2, wherein the overmolded components 20, 30 and 40 surround and embed the elongated mounting bar 2 in the regions thereof covered. In the regions of the overmolded guide 20, support body 30, and contact holding body 40 the elongated mounting bar is provided with projections and/or recesses in the surface of the elongated mounting bar, for example in the form of protruding knobs or flanges or as grooves in the surface. Such projections and/or recesses in the surface are embedded and/or filled by plastic material of the overmolded guide 20, support body 30, and contact holding body 40 to form positive-locking engagement between the elongated mounting bar 2 and the guide 20, support body 30, and contact holding body 40 such that these bodies are fixedly secured against any axial movement along the elongated mounting bar 2.

Figure 2:
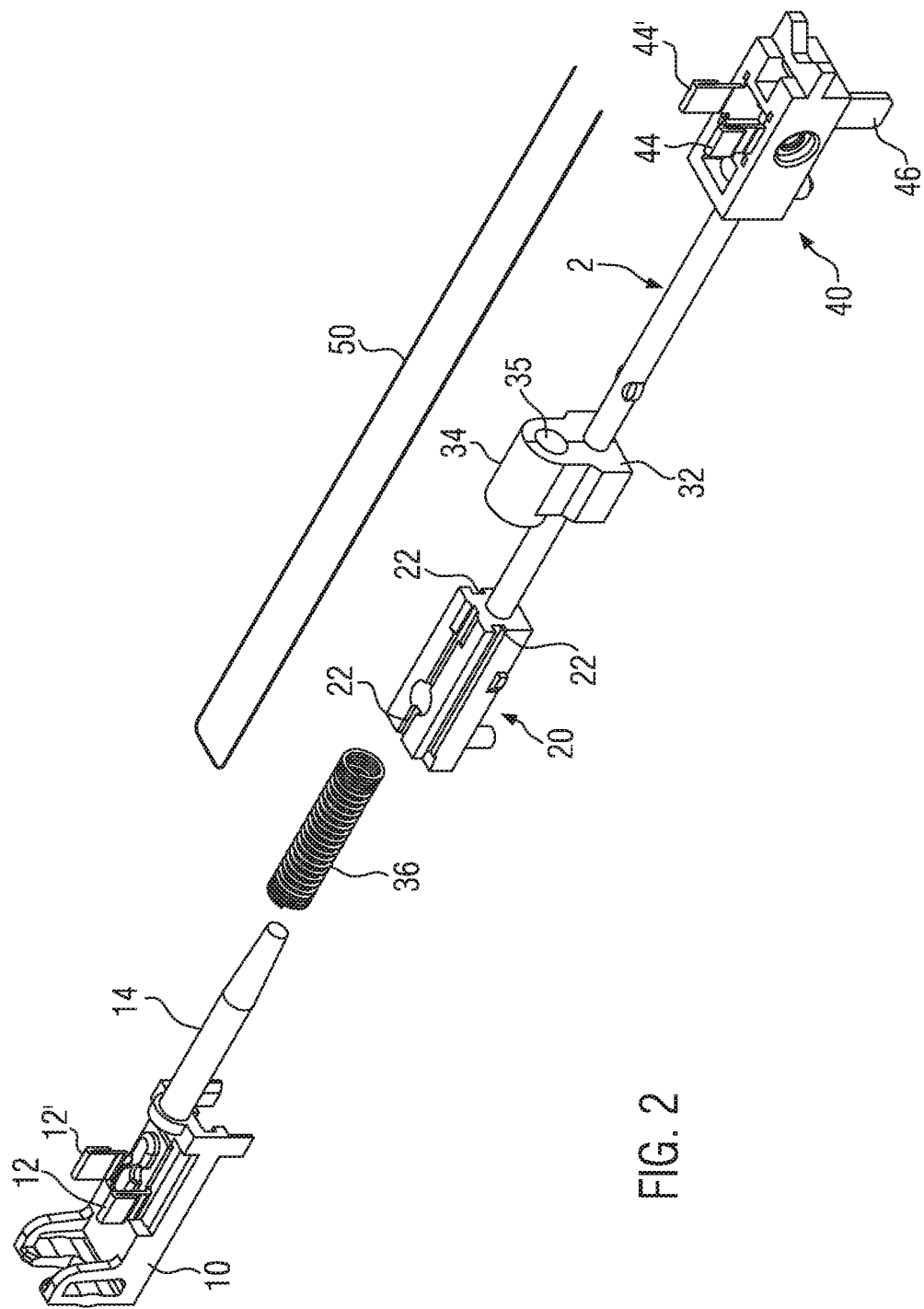
FIG. 2 shows an exploded perspective view of the actuator of FIG. 1.
Figure 3:
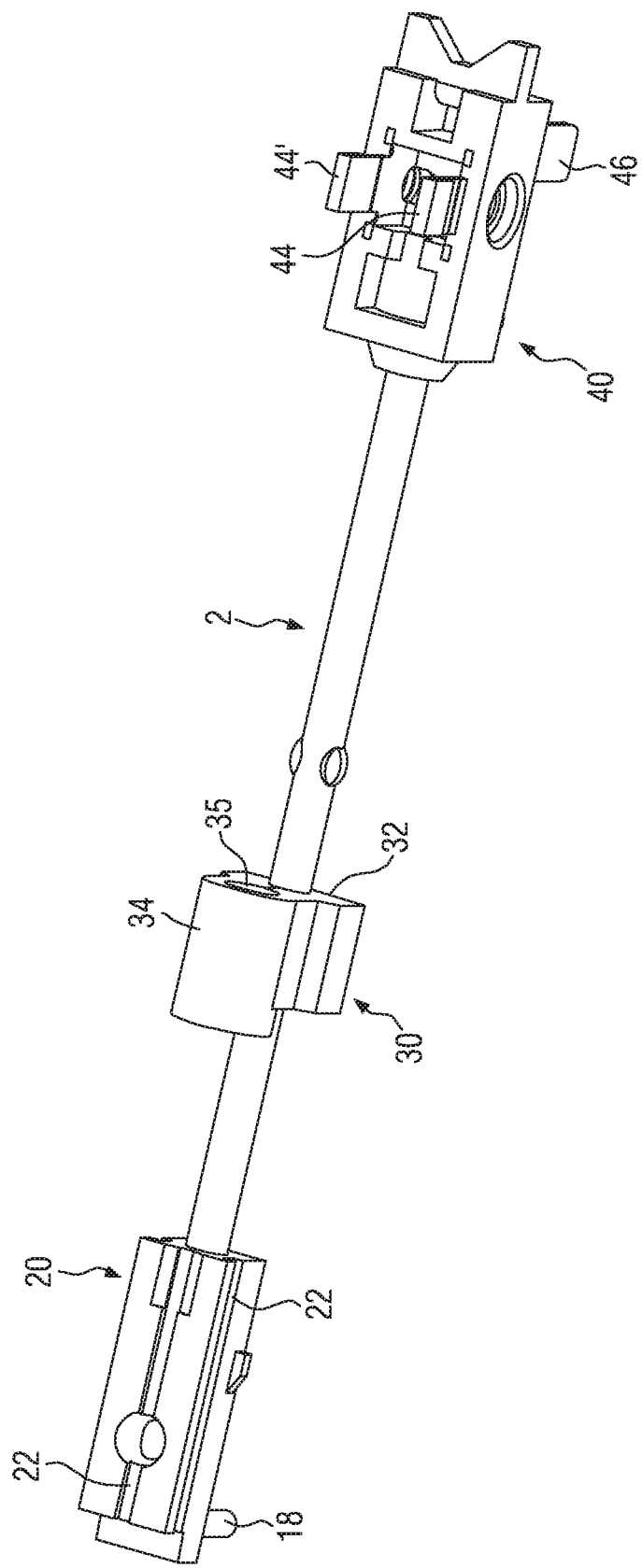
FIG. 3 shows a perspective view of the actuator of FIGS. 1 and 2 with some of its components removed.

The guide 20, as can best be seen in FIGS. 2 and 3, surrounds the first end portion of the elongated mounting bar 2 and has a cubic shape. This guide 20 is formed as a guide rail having three guide slots 22 having a linear extension in a direction parallel to the longitudinal axis of the elongated mounting bar 2. Two guide slots 22 are formed as opposite guide slots in opposite side walls of the guide 20, and a third guide slot 22 is formed in the upper wall of the guide 20. These guide slots 22 are spaced apart in a circumferential direction of the guide 20 in a view along the longitudinal axis of the elongated mounting bar. This distributed arrangement of several parallel guide slots 22 serves to provide an engagement with the sliding body 10 which allows sliding movement in the direction along the linear extension of the guide slots 22, but prevents movements transverse to the direction of the linear extension of the guide slots 22 to keep the sliding body 10 and the guide rail as an assembly.

The sliding body 10 has, in a cross-sectional view, this shape of an inverse U, and has protruding ledges 16 on the inner walls which cooperate with the guide slots 22 of the guide 20. To couple the sliding body 10 to the guide rail the sliding body 10 is pushed onto the front end portion of the guide rail such that the protruding ledges 16 on the inner wall of the sliding body 10 are inserted into the guide slots 22 and slide therethrough to couple the sliding body 10 to the guide rail by engagement of the protruding ledges 16 and the guide slots 22 to establish a sliding body/guide rail assembly which allows linear movement of the sliding body 10 in the direction of the guide slots 22 along the guide rail.

The support body 30 comprises a mounting portion 32 surrounding and enclosing the elongated mounting bar 2 in its intermediate portion. As mentioned before the support body 30 is formed by injection molding by overmolding the elongated mounting bar 2 to form the support body as an overmolded component. The elongated mounting bar 2 comprises elevated or recessed surface structures which are embedded in the overmolded component of the support body so that it is securely fixed against any axial movements along the elongated mounting bar 2. A socket 34 of the mounting body 30 is connected to the mounting portion 32. The socket 34 is of cylindrical shape and has an opening facing the sliding body 10 and an inner cavity adjoining the opening of the socket 34. The opening and the cavity of the socket 34 are dimensioned to be able to receive an end portion of a spring, here in the form of a helical compression spring 36.

The socket 34 supports the spring 36 which with its end rests on an inner wall of the cavity of the socket 34, namely an annular bottom wall portion surrounding a further opening 35 opposite to the opening receiving the end portion of the helical compression spring. The socket 34 holds the spring 36 oriented in a direction towards the sliding body 10.

Figure 4:
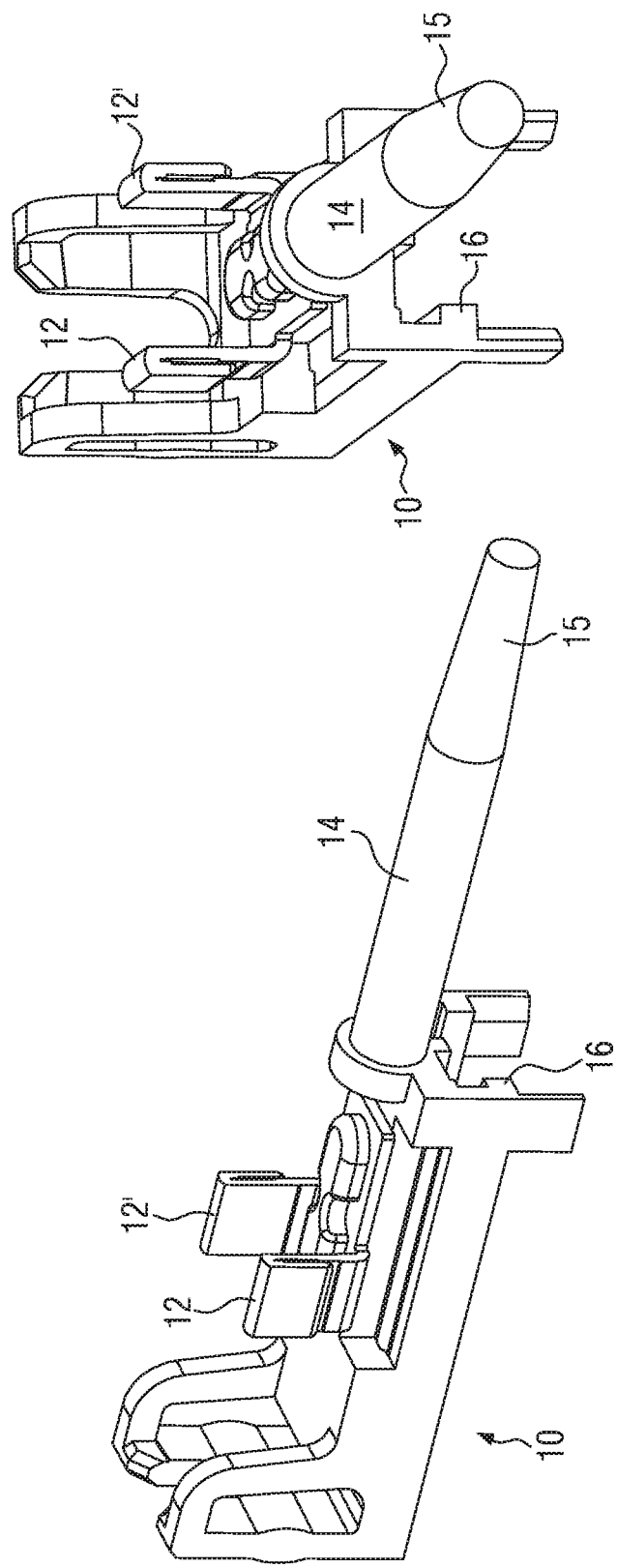
FIG. 4 shows two perspective views of a sliding body of the actuator of FIGS. 1 to 3.

The sliding body 10 is provided at its end facing the support body 30 with a stud 14 protruding in the direction towards the support body 30, as can be seen in FIGS. 2 and 4. The stud 14 has a frustoconical end portion 15. The stud 14 is dimensioned to be received in the interior of the helical compression spring 36 by being introduced through the end opening opposite to the end portion received in the socket 34 of the support body 30. In the assembled state, as shown in FIG. 1, the stud 14 projects through the interior of helical compression spring 36 and extends into the cavity of socket 34 of the support body 30. In this manner the stud 14 of the sliding body 10 holds the compression spring 36 properly positioned between the socket 34 and the end portion of the sliding body 10, and prevents any twisting or flexing of the spring out of its straight orientation.

In one embodiment the total length of the stud 14 is such that the stud 14 does not completely extend into the cavity of the socket 34, but leaves sufficient clearance to the bottom of the socket 34 so that the sliding body can be moved with its stud 14 extending into the cavity of socket 34 to the retracted position by pulling the sliding body 10 backwards on the guide rail. In an alternative embodiment which is shown in the Figures the stud 14 extends completely into the cavity of the socket 34, and when the sliding body 10 is pulled to its retracted position a tip portion of the frustoconical end portion 15 penetrates through the further opening 35 and protrudes from the socket 34, as can be seen in FIG. 6.

At the second end portion of the elongated mounting bar 2 opposite to the first end portion a contact holding body 40 is fixed in which stationary contacts 44, 44' are incorporated. These contacts 44, 44' may be incorporated by partially embedding them in the material of the contact holding body when the latter is formed on the elongated mounting bar by injection molding as an overmolded component. The stationary contacts 44, 44' may have the form of crimp contacts which allow to connect an end portion of the SMA wire 50 by crimping the crimp contacts. In this manner the two opposite ends of the SMA wire 50 are mechanically and electrically connected to the stationary contacts 44, 44'. The contacts 44, 44' may have extensions which protrude on the opposite side from the contact holding body 40 as end tabs 46, 46' which may be used to connect them to contact points on a printed circuit board as will be described further below.

The SMA wire 50 is connected by crimping to a first one of the two stationary contacts, namely to stationary contact 44. From there it extends rectilinearly parallel to the longitudinal axis of the elongated mounting bar 2 to a first connector 12 incorporated in the sliding body 10, to which connector 12 the SMA wire is connected. This connector 12 may likewise be in the form of a crimp contact. Extending further from the first connector 12 the SMA wire 50 turns around by 180 degrees and is connected to a second connector 12' which is incorporated into the sliding body 10 next to the first connector 12. Between the second connector 12' and the second one of the two stationary contacts, namely stationary contact 44', a second rectilinear section of the SMA wire 50 extends which is parallel and symmetrical to the first rectilinear section between the first one of the two stationary contacts 44 and the first connector 12.

In the preferred embodiment the first and second connectors 12, 12' are end portions of a unitary component of conducting material. Therefore, the first and second connectors 12, 12' are electrically connected. Due to the larger dimensions of the connectors 12, 12' compared to the thin SMA wire 50 the resistance of the current path between the two connectors 12, 12' is significantly lower than the resistance of the turned around end portion of the loop of the SMA wire so that the major part of the current through the SMA wire 50 will flow directly between the first and second connectors 12, 12' so that the turned around loop end portion of the SMA wire is not significantly heated up by current flow. As already mentioned above this avoids shortening of the curved wire section between the first and second connectors which would create stresses in this wire part if it is routed around and supported by a curved guide member.

When the actuator is activated by supplying electric energy, namely a voltage difference at the stationary contacts 44, 44', current flows through the rectilinear sections of the SMA wire 50 and between the first and second connectors 12, 12' to heat up the rectilinear SMA wire portions between the stationary contacts 44, 44' and the first and second connectors 12, 12' to reach the threshold temperature. Upon reaching the threshold temperature the heated rectilinear sections of the SMA wire 50 between the stationary contacts 44, 44' and the connectors 12, 12' shorten which causes a pulling force on the first and second connectors 12, 12' of the sliding body 10. Due to this force exerted by the shortening of the SMA wire 50 on the first and second connectors 12, 12' the sliding body 10 is pulled backwards, towards the stationary contacts 44, 44' by a certain distance to move the sliding body 10 from the rest position to the retracted position. This transition of the actuator from the sliding body 10 in the rest position to the activated state of the actuator with the sliding body 10 in the retracted position is shown in FIGS. 5 and 6.

As can be seen in FIG. 6 the shortening of the rectilinear SMA wire portions between the stationary contacts 44, 44' and the connectors 12, 12' moved the sliding body 10 backwards with respect to the guide 20 by a certain distance against the bias force of the compression spring 36. As can also be seen in FIG. 6 this backward movement of the sliding body 10 also caused that the stud 14 moved further into the cavity of the socket 34 of the support body 30 so that in the retracted position the end portion of the frustoconical end portion 15 of the stud 14 projects from the further opening 35 in the bottom wall of the socket 34.

When the activation of the actuator is terminated by ceasing electric power supply to the stationary contacts 44, 44', the heated up SMA wire portions rapidly cool down which causes a state transition which lets the shortened SMA wire portions return to their original length. These added length amounts of the two rectilinear SMA wire portions permits the helical compression spring 36 to move the sliding body 10 from the retracted position of FIG. 6 back again to its rest position of FIG. 5.

As can be seen in FIG. 1 the guide 20 comprises a support pin 18, and the contact holding body 40 comprises a support pin 42. The support pin 18 is adapted to be pushed into a mounting opening in a printed circuit board 60 so that an end portion of the support pin protrudes from the lower surface of the printed circuit board. The support pin is then fixed by hot staking which deforms the protruding end portion by melting to form a rivet, as can be seen in FIG. 7 which shows in the lower part on the left hand side the lower surface of the printed circuit board 60 with the rivets formed by hot staking.

Alternatively the support pin 18 may be provided with an enlarged diameter end portion from the very beginning (not shown in the drawings). This may be pressed into a mounting opening of the printed circuit board 60, causing elastic deformation of the enlarged diameter end portion, which end portion eventually snaps back and abuts the lower surface of the printed circuit board 60 to attach the mounting pin 18 of the guide 20 to the printed circuit board 60.

As can be seen in the perspective view of the lower side of the printed circuit board 60 the positioning of each actuator on the printed circuit board 60 is assisted by support pin 42 of the contact holding body 40, wherein a lower end portion of the support pin 42 is received in an opening of the printed circuit board.

As can be seen in the perspective view in the upper part of FIG. 7 four actuators according to the present invention are mounted in parallel on the printed circuit board 60.

Furthermore, it can be seen in the perspective view of the lower side of the printed circuit board 60 in the lower part of FIG. 7 and the enlarged detail thereof that the end tabs 46, 46' of the stationary contacts 44, 44' have been introduced in slots 62 of the printed circuit board 60. When mounting an actuator on the printed circuit board 60 the support pin 18 is introduced into the associated mounting opening in the printed circuit board to protrude from the lower side of the printed circuit board. The protruding end of the support pin 18 is molten to fix it by hot stacking to form a rivet end portion of the support pin 18 on the lower surface of the printed circuit board. At the same time the support pin 42 of the contact holding body 40 is introduced in the associated mounting opening. This is accompanied by introducing the end tabs 46, 46' into the associated slots 62. In order to couple the end tabs 46, 46' to the printed circuit board for electric and mechanical connection the end portions of the end tabs 46, 46' protruding from the slots 62 are twisted which causes a permanent deformation of the end portions in the slots 62. This provides for a mechanical engagement of the end tabs 46, 46' in the slots 62. Furthermore, the slots 62 are provided with conducting edges 64 extending around and through the slots 62. Due to the twisted deformation of the end portions of the end tabs 46, 46' are in contact with the conductive edges 62 of the slots to thereby provide electric connection of the end tabs 46, 46', and in this way also of the stationary contacts 44, 44', to the printed circuit board 60.

FIG. 8 shows further perspective views of the valve assembly in which four actuators according to the present invention are mounted in parallel, wherein the perspective view on the left hand side shows parts of the valve elements in an exploded view, and the perspective view in the upper part on the right hand side show the valve elements in the assembled state.

In the assembled state forward end portions of the sliding bodies 10 are coupled to rearward end portions of valve pistons 70. Each valve piston 70 controls an input opening of an associated valve chamber to allow input of pressurized air into the valve chamber when the valve piston is pulled away from a valve seat from a rest position closing the input opening to a pulled back position. This movement of a valve piston 70 from the rest position in abutment on a valve input opening to a pulled back position allowing pressurized air to enter the valve chamber is effected by activating the associated actuator which causes the sliding body 10 to be pulled back from the rest position to its retracted position, which movement is transmitted by the sliding body 10 to the coupled valve piston 70 which is thereby moved from the closing position in abutment on the valve input seat to an open position in which pressurized air flows into the valve chamber and flows further to an associated spigot 72 from where it flows to a connected air cell.

REFERENCE NUMERALS 2 elongated mounting bar
10 sliding body
12, 12' connectors
14 stud
15 frustoconical end portion
16 protruding ledge
18 support pin
20 guide
22 guide slot
30 support body
32 support body fixation portion
34 socket
35 further opening of the socket
36 spring
40 contact holding body
42 support pin
44, 44' stationary contacts
46, 46' end tabs
50 SMA wire
60 printed circuit board
62 slot
64 conductive edge
70 valve piston
72 spigot

The invention claimed is:

1. An actuator comprising:
a sliding body moveable along a guide between a rest position and a retracted position,
a spring resting on a support body and acting on the sliding body to exert a bias force urging the sliding body to the rest position, and
a SMA wire having two opposite ends being mechanically and electrically connected to a respective one of two stationary contacts and forming a loop between the opposite ends which is connected to the sliding body, wherein the SMA wire is arranged to, when activated by electric energy supply, pull the sliding body away from the rest position to the retracted position,
wherein the guide is fixed to a first end portion of an elongated mounting bar, the support body is fixed to an intermediate portion of the elongated mounting bar, and a contact holding body, in which the two contacts are incorporated, is fixed to a second end portion, opposite to the first end portion, of the mounting bar, wherein the guide is formed as a guide rail comprising at least one linear guide slot extending parallel to a longitudinal direction of the elongated mounting bar, and wherein the sliding body is provided with at least one protruding ledge which is received in and slidably moveable along the at least one linear guide slot.

2. The actuator according to claim 1, wherein the sliding body at least partially encompasses the guide rail and has at least two protruding ledges, and the at least one linear guide slot of the guide rail comprises at least two complementary arranged guide slots which are spaced apart from each other in a circumferential direction in a plane perpendicular to a direction of linear extension of the guide slots to provide engagement of the sliding body and the guide rail against movements transverse to the direction of linear extension of the guide slots.

3. The actuator according to claim 1, wherein the support body comprises a mounting portion surrounding an intermediate portion of the elongated mounting bar and being connected thereto, and a socket connected to the mounting portion, the socket having an opening facing towards the sliding body and arranged to receive and support an end portion of the spring which is a helical compression spring which extends parallel to a longitudinal axis of the elongated mounting bar towards the sliding body to be able to exert a bias force on the sliding body.

4. The actuator according to claim 1, wherein an end portion of the sliding body, facing towards the support body, is provided with a stud extending in a direction parallel to the longitudinal direction of the elongated mounting bar towards the intermediate portion thereof, the stud being arranged to be received in an interior of the spring which is formed as a helical compression spring and to extend along a part of its length therein.

5. The actuator according to claim 3, wherein an end portion of the sliding body is provided with a stud, the stud is provided with a frustoconical outer end portion, and the socket has, opposite to the opening receiving the helical compression spring, a further opening of lower diameter and coaxial to the opening receiving the helical compression spring, which further opening is surrounded by an annular bottom wall portion of the socket on which annular bottom wall portion the helical compression spring rests and which further opening is arranged to receive a tip portion of the frustoconical outer end portion when the sliding body is moved to the retracted position.

6. The actuator according to claim 1, wherein the support body comprises a mounting portion and a socket connected to the mounting portion, the socket having an opening facing towards the sliding body and arranged to receive and support an end portion of the spring, which is a helical compression spring.

7. The actuator according to claim 1, wherein the SMA wire is arranged to extend from a first one of the two stationary contacts along the elongated mounting bar to a first connector which is incorporated in the sliding body and to which the SMA wire is connected, from there extends to turn around in a 180 degrees curve to a second connector which is incorporated in the sliding body next to the first connector and to which the SMA wire is connected, and from there back along the elongated mounting bar to a second one of the two stationary contacts.

8. The actuator according to claim 7, wherein the first and second connectors of the sliding body are conductive and are electrically connected to each other.

9. The actuator according to claim 1, wherein there are two parallel SMA wires, a first SMA wire being arranged to extend from a first one of the two stationary contacts along the elongated mounting bar and is connected to a first connector incorporated in the sliding body, and a second one being arranged to extend from a second one of the two stationary contacts along the elongated mounting bar and is connected to a second connector incorporated in the sliding body next to the first connector, the first and second connectors of the sliding body being conductive and are electrically connected to each other.

10. The actuator according to claim 1, wherein the mounting bar is a metal pin.

11. The actuator according to claim 1, wherein a surface of the elongated mounting bar is provided with projections and/or recesses in the first end portion, in the intermediate portion and in the second end portion, and wherein the guide, the support body and the contact holding body are each made of plastic as overmolded components surrounding and embedding portions of the elongated mounting bar in positive-locking engagement with the projections and/or recesses of the elongated mounting bar.

12. The actuator according to claim 1, wherein the actuator is mounted on a printed circuit board, and the stationary contacts are partially embedded in the contact holding body and project therefrom in in a first direction extending away from the printed circuit board to provide the stationary contacts for the SMA wire and in a second direction opposite to the first direction and towards the printed circuit board to form end tabs extending to the printed circuit board, each end tab being electrically and mechanically connected to the printed circuit board by extending through a slot in the printed circuit board with conductive edges, wherein connection of each end tab in an associated slot is formed by a permanent deformation of the end tab to a bent or twisted shape having contact with a portion of the conductive edge of the associated slot.

13. The actuator according to claim 12, wherein the guide and the contact holding body each are provided with a support pin extending away from the elongated mounting bar and being configured to be received and fixed in mounting openings of the printed circuit board to hold the actuator on the printed circuit board.

14. A valve for controlling pressurized air flow to an inflatable air cell in a vehicle seat, the valve comprising:
a valve chamber communicating with a spigot and having a valve chamber opening,
a valve piston which is movable between a position in abutment on a valve seat around the valve chamber opening and a retracted position pulled away from the valve seat to open the valve chamber opening, and
an actuator comprising:
a sliding body moveable along a guide between a rest position and a retracted position,
a spring resting on a support body and acting on the sliding body to exert a bias force urging the sliding body to the rest position, and
a SMA wire having opposite ends being mechanically and electrically connected to a respective one of two stationary contacts and forming a loop between the opposite ends which is connected to the sliding body, wherein the SMA wire is arranged to, when activated by electric energy supply, pull the sliding body away from the rest position to the retracted position,
wherein the guide is fixed to a first end portion of an elongated mounting bar, the support body is fixed to an intermediate portion of the elongated mounting bar, and a contact holding body in which the two contacts are incorporated is fixed to a second end portion, opposite to the first end portion, of the elongated mounting bar,
wherein the sliding body of the actuator is coupled to the valve piston such that, upon activation of the actuator by electric energy supply to the SMA wire, the valve piston is pulled away from the position in abutment on the valve seat by movement of the sliding body from the rest position to the retracted position,
wherein an end portion of the sliding body, facing towards the support body, is provided with a stud extending in a direction parallel to a longitudinal direction of the elongated mounting bar towards the intermediate portion thereof, the stud being arranged to be received in an interior of the spring, which is formed as a helical compression spring,
and wherein the stud is provided with a frustoconical outer end portion, and the support body has a socket arranged to receive the stud.

15. The valve according to claim 14, wherein the guide is formed as a guide rail comprising at least one linear guide slot extending parallel to a longitudinal direction of the elongated mounting bar, wherein the sliding body is provided with at least one protruding ledge which is received in and slidably moveable along the at least one linear guide slot.

16. The valve according to claim 15, wherein the sliding body at least partially encompasses the guide rail and has at least two protruding ledges, and the at least one linear guide slot of the guide rail has comprises at least two complementary arranged guide slots which are spaced apart from each other in a circumferential direction in a plane perpendicular to a direction of linear extension of the guide slots to provide engagement of the sliding body and the guide rail against movements transverse to the direction of linear extension of the guide slots (22).

17. The valve according to claim 14, wherein the support body comprises a mounting portion surrounding the intermediate portion of the elongated mounting bar and being connected thereto, and the socket is connected to the mounting portion, the socket having an opening facing towards the sliding body and arranged to receive and support an end portion of the spring which extends parallel to a longitudinal axis of the elongated mounting bar towards the sliding body to be able to exert a bias force on the sliding body.

18. The valve of claim 17, wherein the socket has, opposite to the opening receiving the helical compression spring, a further opening of lower diameter and coaxial to the opening receiving the helical compression spring, which further opening is surrounded by an annular bottom wall portion of the socket on which annular bottom wall portion the helical compression spring rests and which further opening is arranged to receive a tip portion of the frustoconical outer end portion when the sliding body is moved to the retracted position.

19. An actuator comprising:
a sliding body moveable along a guide between a rest position and a retracted position,
a spring resting on a support body and acting on the sliding body to exert a bias force urging the sliding body to the rest position, and
a SMA wire having two opposite ends being mechanically and electrically connected to a respective one of two stationary contacts and forming a loop between the opposite ends which is connected to the sliding body, wherein the SMA wire is arranged to, when activated by electric energy supply, pull the sliding body away from the rest position to the retracted position,
wherein the guide is fixed to a first end portion of an elongated mounting bar, the support body is fixed to an intermediate portion of the elongated mounting bar, and a contact holding body, in which the two contacts are incorporated, is fixed to a second end portion, opposite to the first end portion, of the elongated mounting bar,
and wherein the SMA wire is arranged to extend from a first one of the two stationary contacts along the elongated mounting bar to a first connector which is incorporated in the sliding body and to which the SMA wire is connected, from there extends to turn around in a 180 degrees curve to a second connector which is incorporated in the sliding body next to the first connector and to which the SMA wire is connected, and from there back along the elongated mounting bar to a second one of the two stationary contacts.

20. A valve for controlling pressurized air flow to an inflatable air cell in a vehicle seat, the valve comprising:
a valve chamber configured to communicate with a spigot and having a valve chamber opening,
a valve piston which is movable between a position in abutment on a valve seat around the valve chamber opening and a retracted position pulled away from the valve seat to open the valve chamber opening, and
the actuator of claim 19,
wherein the sliding body of the actuator is coupled to the valve piston such that, upon activation of the actuator by electric energy supply to the SMA wire, the valve piston is pulled away from the position in abutment on the valve seat by movement of the sliding body from the rest position to the retracted position.

* * * * *